(12) United States Patent
Kirwan

(10) Patent No.: US 8,234,142 B2
(45) Date of Patent: Jul. 31, 2012

(54) METHOD AND SYSTEM FOR STRATEGIC PROJECT PLANNING

(75) Inventor: Michael J. Kirwan, Leawood, KS (US)

(73) Assignee: DSheet LLC, Leawood, KS (US)

(*) Notice: Subject to any disclaimer, the term of this patent is extended or adjusted under 35 U.S.C. 154(b) by 1404 days.

(21) Appl. No.: 11/828,821

(22) Filed: Jul. 26, 2007

(65) Prior Publication Data

US 2008/0027779 A1 Jan. 31, 2008

Related U.S. Application Data

(60) Provisional application No. 60/820,445, filed on Jul. 26, 2006.

(51) Int. Cl.
*G06Q 10/00* (2012.01)
(52) U.S. Cl. ....................... 705/7.13; 705/7.11
(58) Field of Classification Search ........................ 705/9
See application file for complete search history.

(56) References Cited

U.S. PATENT DOCUMENTS

| | | | | |
|---|---|---|---|---|
| 5,233,513 | A * | 8/1993 | Doyle | 705/7.11 |
| 6,147,685 | A * | 11/2000 | Bliss et al. | 715/769 |
| 6,289,317 | B1 * | 9/2001 | Peterson | 705/7.37 |
| 7,096,188 | B1 * | 8/2006 | Schlick et al. | 705/7.13 |
| 2002/0186254 | A1 * | 12/2002 | Monbaron | 345/810 |
| 2004/0254757 | A1 * | 12/2004 | Vitale et al. | 702/122 |
| 2005/0120108 | A1 * | 6/2005 | Wisniewski et al. | 709/224 |
| 2006/0020500 | A1 * | 1/2006 | Turner | 705/7 |
| 2007/0094187 | A1 * | 4/2007 | Anderson et al. | 706/45 |
| 2007/0239600 | A1 * | 10/2007 | Lundberg et al. | 705/40 |

OTHER PUBLICATIONS

Marmel, Elaine. Project 2000 Bible. Copyright 2000.*

* cited by examiner

*Primary Examiner* — William Rankins
(74) *Attorney, Agent, or Firm* — Shook, Hardy & Bacon L.L.P.

(57) ABSTRACT

A strategic planning, project organization, electronic and hardcopy file management system is disclosed that provides its users a quick data capture, data archiving and data retrieval system implemented within a software or hardware database system. Daily use of this system provides its users the capability to utilize either an electronic and hardcopy means to manage their projects in mobile or stationary settings.

8 Claims, 7 Drawing Sheets

METHOD AND SYSTEM FOR STRATEGIC PROJECT PLANNING

CROSS-REFERENCE TO RELATED APPLICATIONS

This application claims the benefit of U.S. Provisional Application No. 60/820,445, filed on Jul. 26, 2006, which is incorporated herein by reference.

STATEMENT REGARDING FEDERALLY SPONSORED RESEARCH OR DEVELOPMENT

Not applicable.

TECHNICAL FIELD

This invention relates generally to computer programs, and more specifically to a system for strategic project management planning system.

BACKGROUND OF THE INVENTION

For many individuals the art of organization or of being organized is abstract. The administrative effort consumed toward achieving a desired level of planning efficiency is often the most time-consuming and, in the end, offers seemingly no real strategic value. Yet an individual's effectiveness is gauged by their ability and skill to organize, develop and communicate clear direction and solutions to others. Tools provided to them on their PCs may assist them in their organization but provide them with little guidance in strategic planning.

SUMMARY OF THE INVENTION

A strategic planning, project organization, electronic and hardcopy file management system is disclosed that provides its users a quick data capture, data archiving and data retrieval system implemented within a software or hardware database system. Daily use of this system provides its users the capability to utilize either an electronic and hardcopy means to manage their projects in mobile or stationary settings.

The database uses a hierarchy of strategy related concepts and a method for assigning keywords and simplified coding that allow the user to quickly capture, classify and retrieve any type of stored information. The database uses deliberate algorithms to organize strategic planning information as unique lists onto a computer generated graphical display, a hardcopy of the display, or series of screens or sheets allowing a user the ability to view one or more days thereon.

Thus, according to the present invention, a system is disclosed with a design and algorithms to store and access pertinent strategic planning information within the database. The database and its screens or outputted hardcopy comprises a strategic planning system designed to focus, and maintain the focus, of its users on the important aspects of a chosen or assigned initiatives. The most prevalent characteristic of the Database System is its computer generated screen or hardcopy sheet that allow the user to quickly add thoughts, ideas, tasks and other resources which increase their probabilities of success toward achieving their initiatives throughout a daily planning process specifically when not able to be at their computing devices.

The objective of the invention is to reduce redundancy of data, improve the performance of storing and retrieving data and automate the process of classifying information while improving the effectiveness and performance of the user toward achieving their strategic initiatives.

BRIEF DESCRIPTION OF THE SEVERAL VIEWS OF THE DRAWINGS

Other objects and advantages of this invention will become apparent upon reading the following detailed description taken in conjunction with the accompanying drawings wherein.

DETAILED DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the general principles of the present invention have been defined herein specifically to provide an automated strategic planning system.

Figure 1:
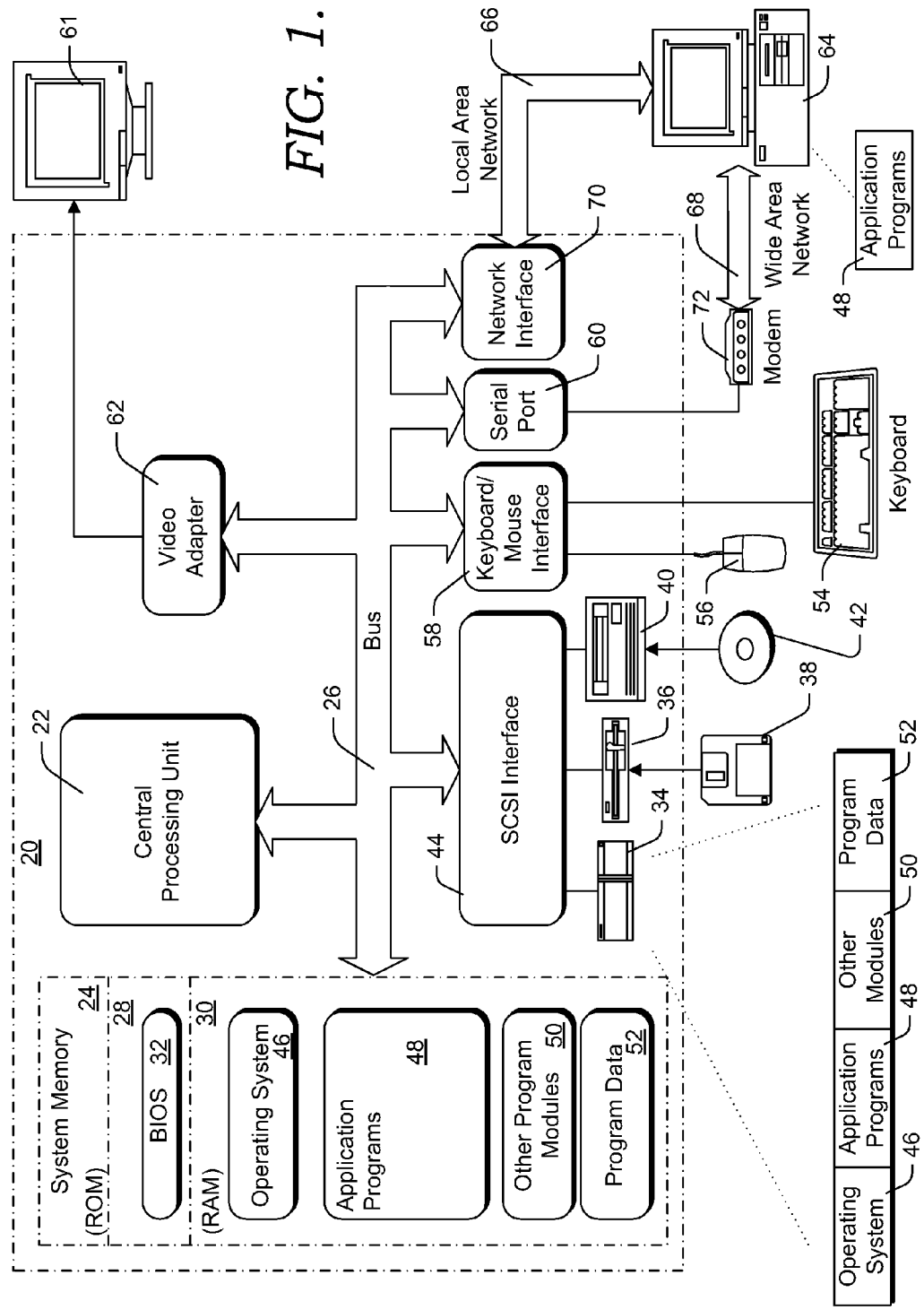
FIG. 1 is a block diagram of a computing system environment suitable for use in implementing the present invention.

The present invention provides a method and system for implementing a strategic planning model. The strategic planning system of the present invention facilitates the planning, scheduling, task input, task output and execution of a set of one or more tasks for a given strategic initiative. FIG. 1 illustrates an example of a suitable computing system environment 100 in which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

With reference to FIG. 1, an exemplary system for implementing the invention includes a general purpose computing device in the form of a computer 110. Components of computer 110 include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital video disks, digital video tape, Bernoulli cartridges, solid state RAM, solid state ROM, and the like. The hard disk drive 141, is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the network interface 170, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Although many other internal components of the computer 110 are not shown, those of ordinary skill in the art will appreciate that such components and the interconnection are well known. Accordingly, additional details concerning the internal construction of the computer 110 need not be disclosed in connection with the present invention.

Figure 2:
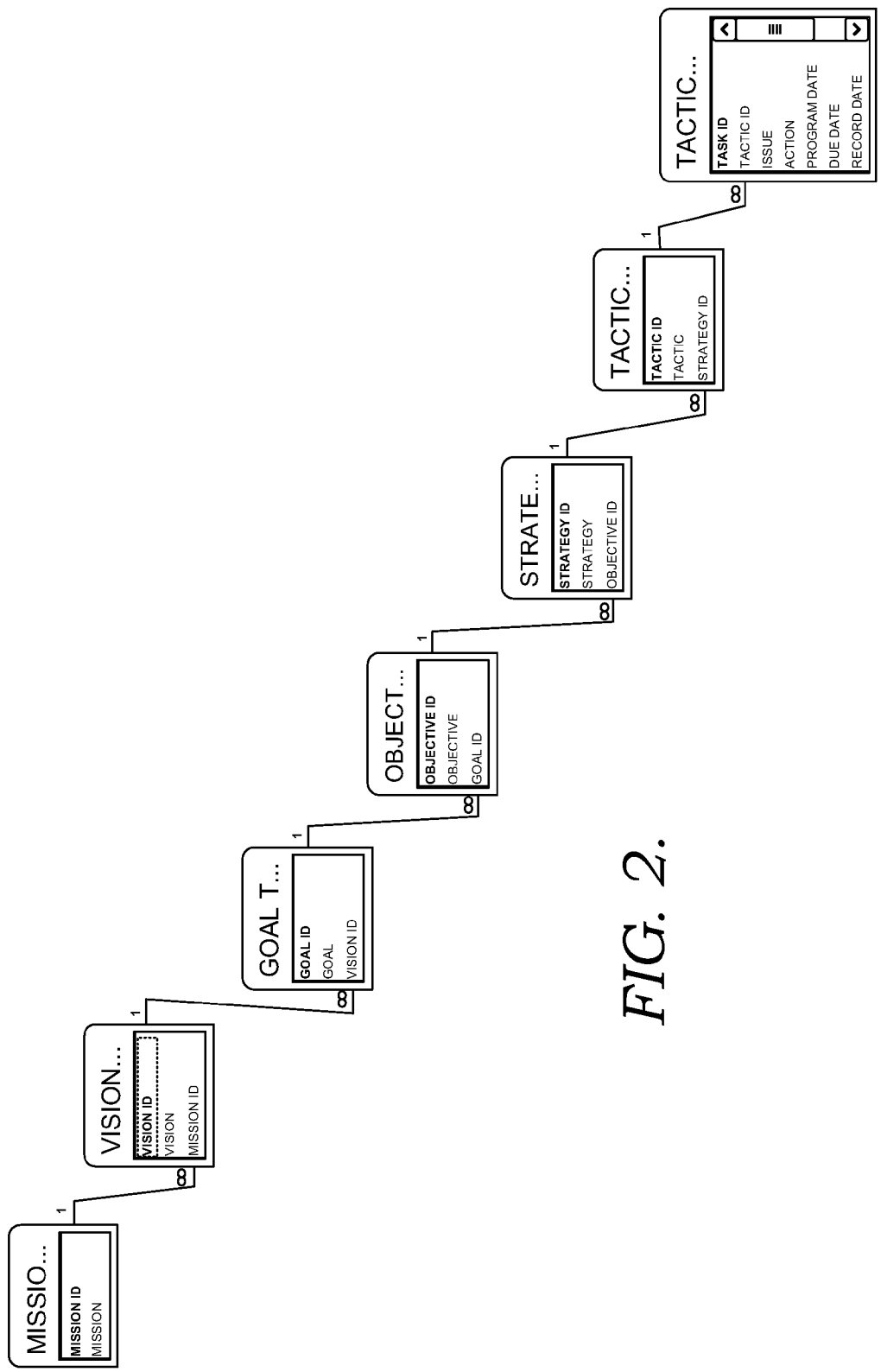
FIG. 2 is an illustration of a relational and distributed strategic planning system database hierarchy according to the invention.
Figure 3:
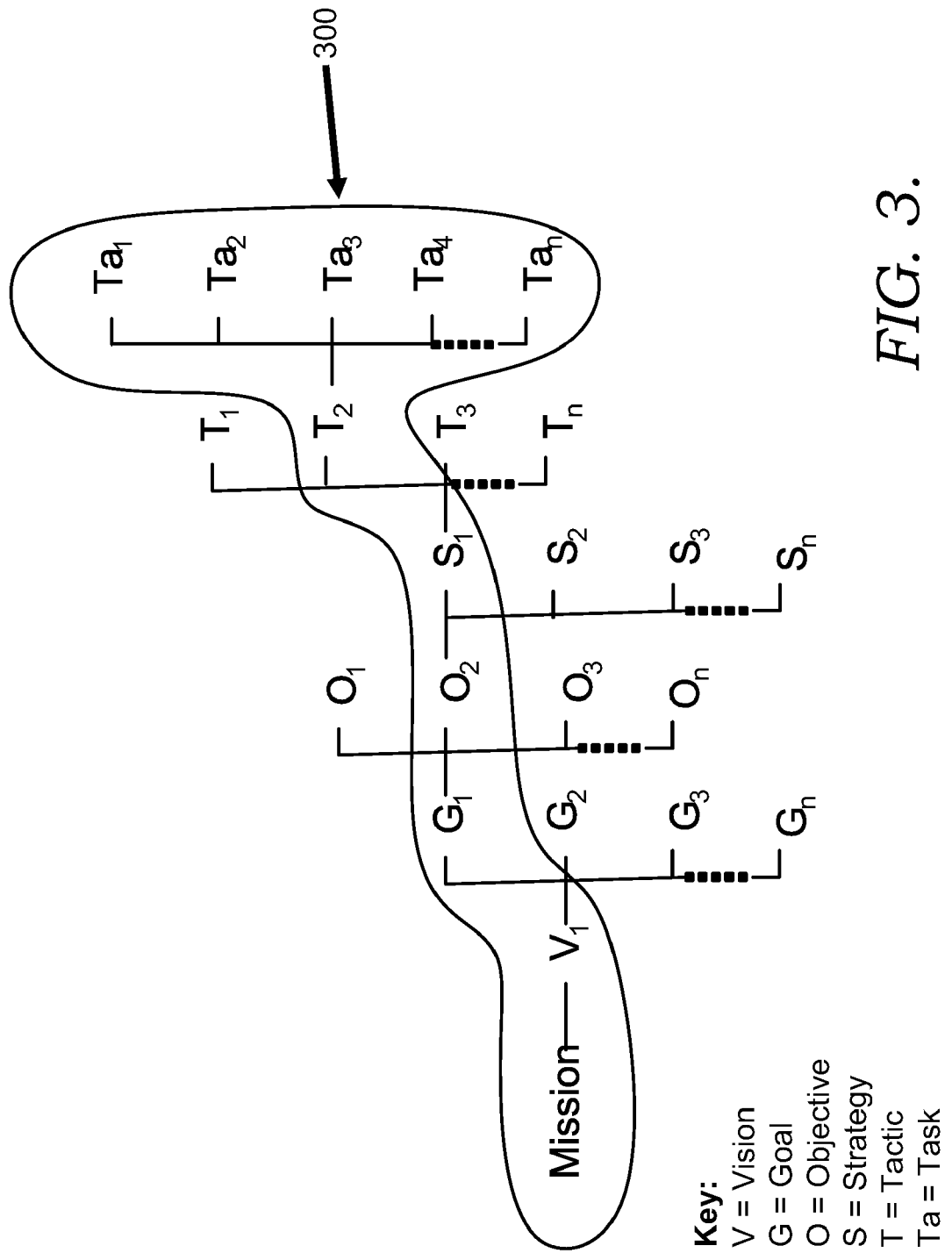
FIG. 3 is a schematic diagram of a mission plan of the present invention.
Figure 4:
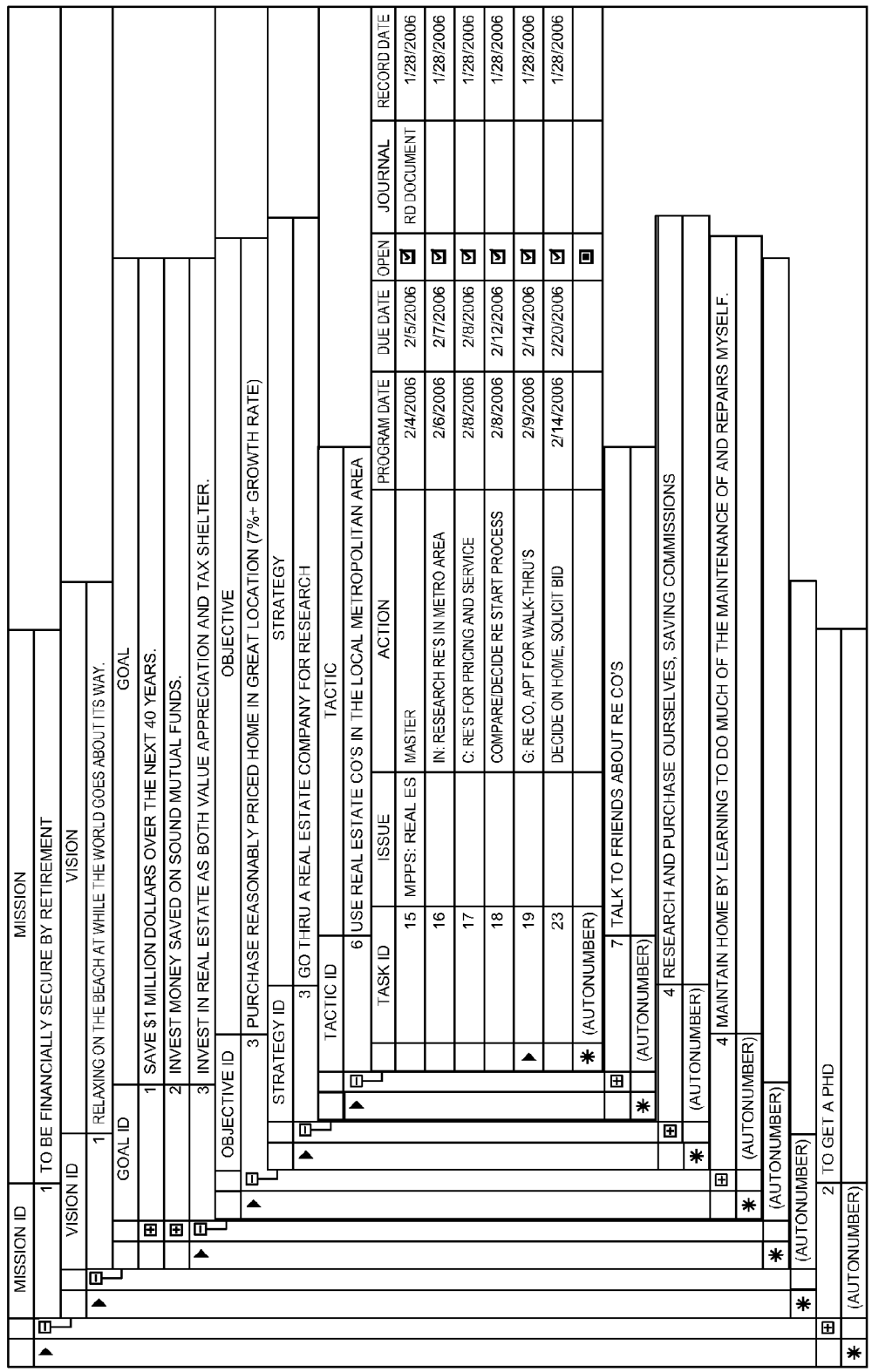
FIG. 4 is a diagram of a mission plan as shown in a layout of the present invention.

The present invention provides a system for implementing a strategic planning model to facilitate the planning, scheduling, task input, task output and execution of a set of one or more tasks for a given strategic initiative. A strategic initiative comprises of a sequence of tasks utilized to achieve an end result. For the invention, the strategic initiative module is a collection of hierarchical fields that prompts a user for user input information to facilitate the completion of a strategic initiative. As shown in FIG. 2, the fields for a particular strategic initiative may include one set of mission and vision, one or more goals, one or more objectives, one or more strategies, one or more tactics and all tasks associated there-with. The system collects the user input for the specific string or branch, as shown in FIGS. 3 and 4, during an initial planning stage and stores them as a mission plan 300.

Pertinent strategic information is populated within these fields by the user as guided by the system's field definitions and prompts, which are aimed to assist the user to more clearly define the mission plan's strategic requirements. After completing one or more mission plans 200 for a given mission, as prompted by the system of the present invention, the user is able to record and recall efficiently bits of information and specific tasks throughout their daily planning routine. The user may create as many missions and mission plans as required or desired within this system.

Information deemed important by the user may become a future resource to the user if it is captured and stored using the planning system of the present invention such that it can be retrieved and later used by the user. The key to enabling the strategic nature of this invention is the ability to quickly retrieve the information after it is stored when needed by the user. The management system codifies, stores and is able to retrieve very small to large bits of strategically pertinent information from a location specific to a user defined strategic initiative. Further, the strategic planning system is capable of storing various forms of media, whether written, telephonic, digital, etc., for the information, if it can be stored within the user's computing device 100. For a personal information management system of strategic nature, information needs to be accessible by the user rapidly such that the user can quickly review the information recalled allowing them to be better informed prior to executing current or future tasks or decisions making.

The architecture of the strategic planning system of the present invention includes a hierarchical database having specified fields, field definitions, an automated list gathering function, a user-coding function, a mission plan module, a journal protocol, and issue keyword assignment.

Database with Hierarchical Fields:

FIG. 2 shows an illustration of a relational and distributed strategic planning system database in accordance with a preferred embodiment of the invention. From the upper left to the lower right the relationships between each of the database tables is shown. They are based on the use of the following hierarchy of fields and field definitions. The system prompts the user to designate the fields at the outset.

1. Mission Field: A top level and unique special assignment, reason or purpose given. The Mission Field has a one-to-one relationship with the Vision Field.

2. Vision Field: This field is populated by the significance of the mission once realized and consists of a short statement noting that when achieved, what difference the mission will make and the results the user is seeking to create.

3. Goal Field: Distinct top level goals of the mission that when collectively complete are clear indicators that the mission is complete. One or more targets that the mission intends to accomplish based on a deliberate and comprehensive analysis of the mission in the Mission Field and the vision in the Vision Field.

4. Objectives Field: Measurable top level steps of each goal. One or more measurable steps supporting each defined goal, i.e., what top level steps should be taken to achieve each of the goals.

5. Strategy Field: One or more approaches chosen to achieve each defined objective.

6. Tactic Field: One or more activities to be deployed that target successful execution of the defined strategies, i.e., a list the activities required to achieve each strategy.

7. Task Table: One or more discrete, achievable steps that are apart of achieving each tactic. Each Task may include:

(a) Task Number Field (ID): The ID of the task (b) Mission Number Field (ID): The Mission ID of a unique project.

(c) Issue Field: Generic tracking field containing keywords or key-phrases. The issue field is only a required field when identified by the user as an 'MPPS:' or 'PPS', which will be described hereinafter. The Issue Field is specifically utilized within the invention's strategic planning system for recall and output.

(d) Action Field: This field is populated by specific task actions required to achieve a tactic. The Action Field may be anything the user desires to record, such as a thought, and idea, a concept, etc.

(e) Program Date Field: The date the task action of the Action Field is planned or programmed to be performed by user.

(f) Due Date Field: Date the task action of the Action Field is required to be completed by user. Default due date is set within the database at 14 days past the record date. The default date is modifiable by user.

(g) Record Date Field: Default date when a Task Action was recorded or entered.

(h) Status or Open Field: Status of the current task as either 'open', if un-checked, or closed. All tasks actions entered are defaulted to open status until closed by the user.

(i) Journal Field: Object file that tracks task information the user deems relevant to the task and issue. Using this field the user can store any information relevant to the task action noted in the Action Field.

(j) Task Time Field: A number, for example, in minutes, representing the anticipated or expected task time the task action will require in order to be completed. Default task time is set to 30 minutes within the database.

(k) Discard Field: If the user later determines that the task is not a part of achieving the tactic then the 'discard' box is checked. The use of this field allows the record to be removed from the task, but not deleted from the system. User may optionally delete the task if desired.

Automated List Gathering and User Coding

The system of the present invention includes an automated list gathering functionality and user coding functionality. These include the steps of task issue coding and task action coding. Task issue coding is a method for categorizing user coding. In the Issue Field, cross-referencing information for input, quick retrieval, querying, list generation and project planning based on the task issue codes provided by the user. It is to be understood by those skilled in the art that this may be utilized through voice-recognition commands. The task issue coding function includes the following codes:

(a) MPPS: "Mission Plan Project Sheet"—the top level planning task for a specific task.

(b) PPS: "Project Planning Sheet"—a planning section for a given task, if required.

The system prompts or enables the user, while completing the Issue Field during the completion of the Task step, to add one of the above task issue codes, typically at the beginning of the field. The 'MPPS' and 'PPS' designators are only used within the 'Issue' field. The designators will be discussed in greater detail hereinafter.

Further, the system provides for task action coding that categorizes through user coding the task actions and cross-references these codes within the Action Field such that information may be input and is available for quick retrieval, querying, list generation and project planning. It is to be understood that these may also be utilized through voice-recognition commands, without departing from the scope of the present invention. The task action codes are as follows:

(a) Wi: "What's Important List"—a item or list of items representing what the user feels is important.

(b) Mt: "Meeting List"—a meeting task or list of meeting tasks identified as requiring a meeting with other individuals.

(c) In: "Internet List"—an Internet Search task or list of Internet Search tasks the users has identified as required search or research items to be performed using the Internet.

(d) Wn: "What's Next List"

(e) Mi: "Milestone List"—a milestone task or list of milestone tasks identifying a project milestone or potential achievement or a list of project milestones or potential achievements.

(f) Id: "Idea List"—a call task or a list of call tasks (persons, organizations or entities the user has identified as needing to call).

(g) Rm: "Reminder List"—a task recorded simply as a reminder to a user that it needs to be performed. An 'R:' can be a recurring task.

(h) By: "Buy List"—a buy task or a list of buy tasks the user has identified (items the user has identified as needing to purchase or procure).

(i) Se: "Send-to List"

(j) Go: "Go to List"—a physical location or list of locations to go to or visit.

(k) Ud: "Update List"

(l) Rp: "Read or Print List"—a required to be read item or list of items required to be read within the computer device or by printing a hardcopy and reading at some later time.

(m) Cl: "Call List"

(n) Fo: "Figure-out List"

(o) Rc: "Recall List"

(p) Cm: "Complete List"

(q) Ds: "Design List"

(r) Th: "Thought or Think-about List"

(s) Ez: "Easy List"—an easy task or a list of easy tasks that can be accomplished quickly, in 15 minutes or less.

(t) Rs: "Research List"

(u) Fu: "Follow-up List"

(v) Pw: "Password List"

The user, while completing the Action Field of the Task step, may include one or more of the above coding designators within the field, typically at the beginning of the field.

A query algorithm of the system enables the user to quickly recall information from the Issue and Task Fields based on either or both the Task Issue Codes and the Task Action Codes. The system enables action field searching using the task action coding designators (both standard and/or user defined. The system uses like queries algorithms that search across all Important Information within your back-end database that were coded with either standard or user defined task action codes. By using the task action codes, the system generates a like list that enables the user to locate all related information to one or more task action codes in one screen. From that screen's generated list, the user can execute one or more of the actions while performing a particular task. For example, if you have designated a time to call people on your list but you need to know all those people that you deemed important enough to call. The user selects the Cl: task action icon from the user interface and a list of persons to call appears.

The system facilitates the efficient management of time by generating like action lists that encourage the user to accomplish like actions when performing a specific task. Another example, is the By: task action designator. By selecting this code, the system generates a 'Buy List'. Thus if the user plans to go shopping, by selecting this buy list icon, a list of all items that the user has designated by the buy list designator appears that the user has collected over the last few days, weeks, or months. The user can make any adhoc list they want to track and get that list instantly, from their computer, their hardcopy sheet, their phone, etc.

Mission Plan and Journal Protocol

The 'Journal' field of the Task table is used to store information pertaining to a particular mission plan or specific issue in the Task table's Issue Field. It is typically a document file but could be any file type depending on the user's need and on the available software on the user's computing device. Generally, information within the Journal Field is raw data captured by the user as the user goes about their planning day. Information stored is organized by user preference but is expected to be reviewed by the user at a later time. Within the Journal, the following protocol is utilized by the system to strategically organize information for fast recall.

A Mission Plan Project Sheet, 'MPPS', is the top level planning sheet for a mission plan 300. The designator 'MPPS' is used once in a specific mission plan's Task 'Issue' field. In the context of a Journal, the 'MPPS' tracks important information relevant to the task as well as required next actions of the task. A Project Planning Sheet, 'PPS', is a designator which represents a sub-planning sheet of the 'MPPS' captured within a specific task record. The designator 'PPS' may be used in one or more Task 'Issues' and may be used as much as necessary within a given Journal.

The use of the above designators distinguish task records containing Journals, which may contain important items and future next actions. Their use facilitates searching and aggregating important information and in identifying important next actions. Both 'MPPS' and 'PPS' are used within the Task table's 'Issue' field to designate an issue that is being tracked by a user. By tagging an 'Issue' with either of these coding sequences enables the efficient recall of stored pertinent data classified by the user by limiting the search to a specific project planning sheet previously created by the user.

Using either 'MPPS' or 'PPS' within the Issue field along with a keyword, a key-phrase, or any combination of words or phrases provides the user with a quick method for recalling Task Issues and the corresponding pertinent information stored within the Journal.

Only one 'MPPS' is assigned within a Mission Plan 300 and within the Journal. Typically, the user will assign the very first Task Issue within a Mission Plan 300 as an 'MPPS'. Additional Task Issues within a Mission Plan 300 may be assigned with the Task Issue code 'PPS' if a Project Planning Sheet Journal, i.e., a sub-planning sheet, is needed. The 'MPPS' Task Issue contains the main Journal within the Mission Plan 300 and is utilized by the user to track all strategic information related to the Mission Plan. The information stored under a MPPS is typically stored chronologically by the user but may be stored in other fashions or schemes as deemed necessary by the user.

If a journal is necessary, the user opens the Journal Field of the system and selects the file type desired. If the Task Issue is identified with either an 'MPPS:' or 'PPS:', a Journal is created automatically and includes within the header section of the Journal the information entered by the user within the Task 'Issue' field. This information is at the very top of the Journal, preferably within the header section. Upon completion, the user is now ready to begin storing and managing information within the system.

The following Journal entry structure is preferably utilized within the Journal field to track necessary information using the keyword and key-phrase method, which will be described below. The Journal is searchable by the user for recall of recorded information within a Journal as needed.

MPPS: [Keyword(s), key-phrase(s) identifying the Mission Plan Project Sheet contained within the Task Issue field] Date of Entry: Subject Heading [Only the subject headings are entered by the user.] Or, PPS: [Keyword(s), key-phrase(s) identifying the Mission Plan Project Sheet contained within the Task Issue field] Date of Entry: Subject Heading [Only the subject headings are entered by the user.]

Issue Keyword Assignment:

Within the 'Issue' field, the user may assign a keyword, a key-phrase or any issue sequence that they desire. Often this may be the project name, email subject title, or the file name of the document stored within the Journal field. The objective is a key sequence that is memorable to the user for fast recall that when combined with Task Issue Coding will significantly speed up recognition and recall of tracked files (Journals). The following method provides the user with a process for defining a key sequence that can be recalled quickly by the user as needed.

1. User inputs the subject of the 'Issue' field and refines the subject into as few of words as necessary. This is the key sequence.

2. If the 'Issue' is considered by the user to be a 'MPPS:' (Mission Plan Project Sheet) or a 'PPS:' (Project Planning Sheet), the user inputs the code 'MPPS:' or 'PPS:' preceding the key sequence in the Issue Field.

Typically, using the above steps to identify a specific and memorable word or words that stick out as the key word or sequence, the user completes the 'Issue' field. Over time, as the user searches for and recalls the 'Issue', the user may revise the 'Issue' to a keyword or phrase that is more appropriate. Assigned key sequences may be quickly recalled via database search using the 'MPPS:' or 'PPS:' assignment in combination with the key sequence assigned with the search feature of the electronic device (i.e., phone, computer desktop or laptop or PDA, etc). The assignment of keywords, phrases or sequences of words or phrases that will be memorable by the user is critical to the rapid recall of strategic information previously stored by the user. If the 'Issue' field uses memorable wording along with the designators above, the recall of the issue will be quickly found by the user. It is to be understood that a keyword is not required. Simply encoding an issue with a MPPS or a PPS Task Issue Code facilitates the rapid searching of issues.

Within the Issue field, by designating, either by the user or by the system automatically, the top (or first) task action for each completed Mission Plan as an MPPS: by itself or followed by a user defined keyword or combination of keywords, there is no question to the user that the file they need is the precise file which stores all their Important Information related to the Mission Plan. The system through a like search locates all MPPS: files or all MPPS: with a given keyword or combination of keywords depending on the search. The system returns these searches almost instantly. Having one file based on a Mission Plan designated as the main file for the Mission plan, i.e., the MPPS, and having all emails and other important documents, meeting minutes, phone conversations, etc, contained under that file facilitates the recall of stored information. Further, the system provides for User Coding searching in conjunction with Task Issue Coding. For example, the system provides the user with the ability to search a "What's Important" Code within a particular top level MPPS. The system provides all user coded Issues along with corresponding object files in any attached journal that were provided under a particular MPPS and codes as "What's Important.".

PPS:

Within the Issue field, by designating any task action as a PPS: followed by a user defined keyword or combination of keywords, a user can quickly retrieve a file having the important information related to a given action. Recall that the Issue field specifies the class or type of issue describing the action. The PPS is used to assist the user in recalling extensive or difficult actions to complete due to the fact that additional information related to completing the action that may not have been available to the user at the time when they entered the action. This is because when information is entered, the user may not yet know how relevant it is until later. If it becomes relevant, a user may designate PPS: into the field (as apposed to MPPS:) and by doing so they can classify the Issue more distinctly as an action that required greater attention and contains greater information related to solving the action. Designating PPS: with keyword(s) sets the issue apart from other issues with a different PPS: and keyword(s).

Searching within the system of the present invention also may be performed using existing database search functions existing within device applications. Searches can also be achieved within a Journal using the search capabilities within the software application. These searches may be based on Task Issue Codes and or Task Action Codes. For example, a user could access they system to search meeting scheduled for a particular day, meetings scheduled for a particular MPPS, or the user could search open task actions for a particular mission plan.

In use, the strategic planning system of the present invention prompts the user to think about and define all the necessary actions required to achieve a specified mission. Additionally, the invention allows the user to quickly store and retrieve relevant information captured throughout their day and later present it to the user (or others designated by the user) in a structured and strategic planning format when needed.

Figure 5:
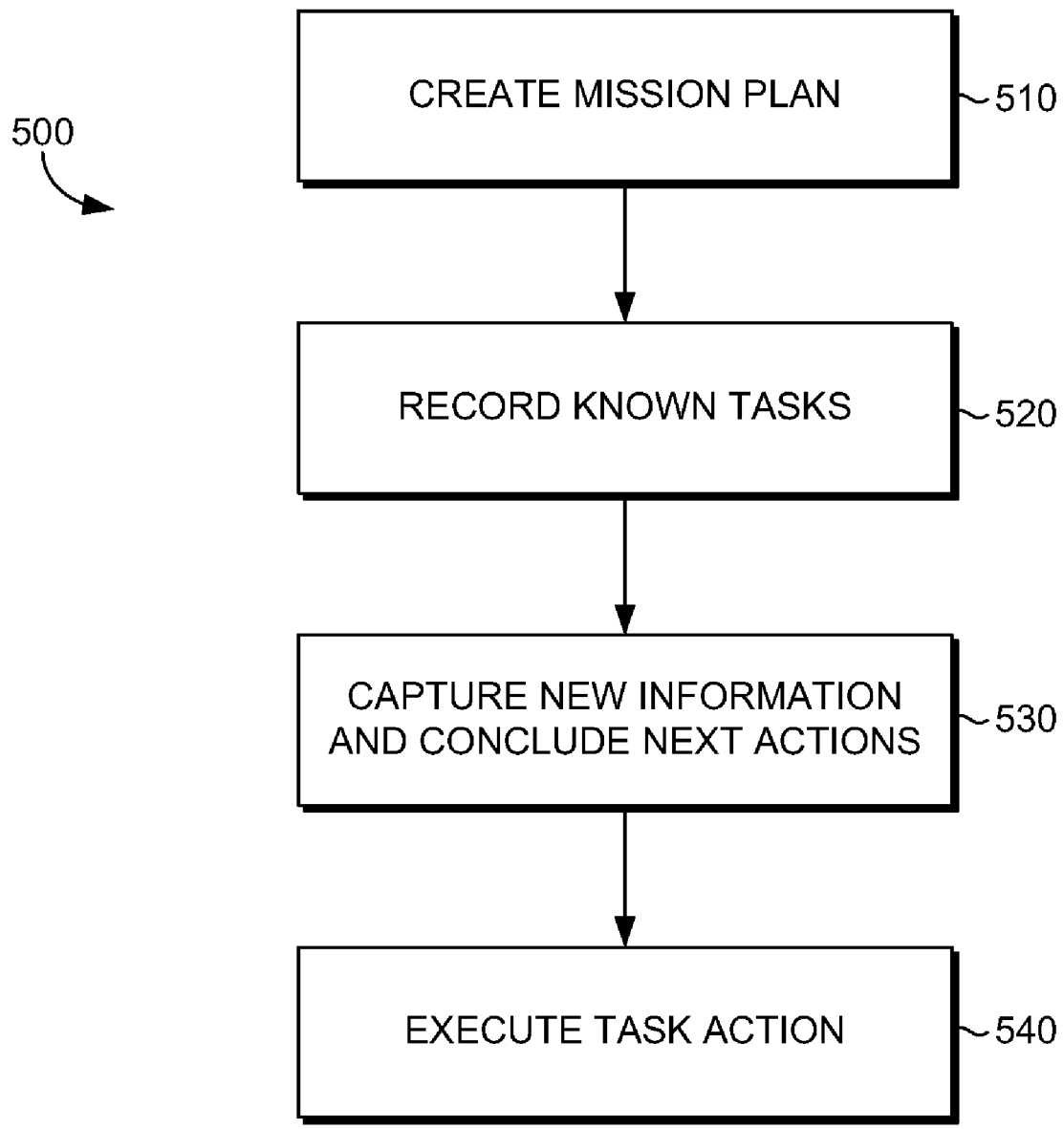
FIG. 5 is a block diagram of the method of creating a mission plan.
Figure 6:
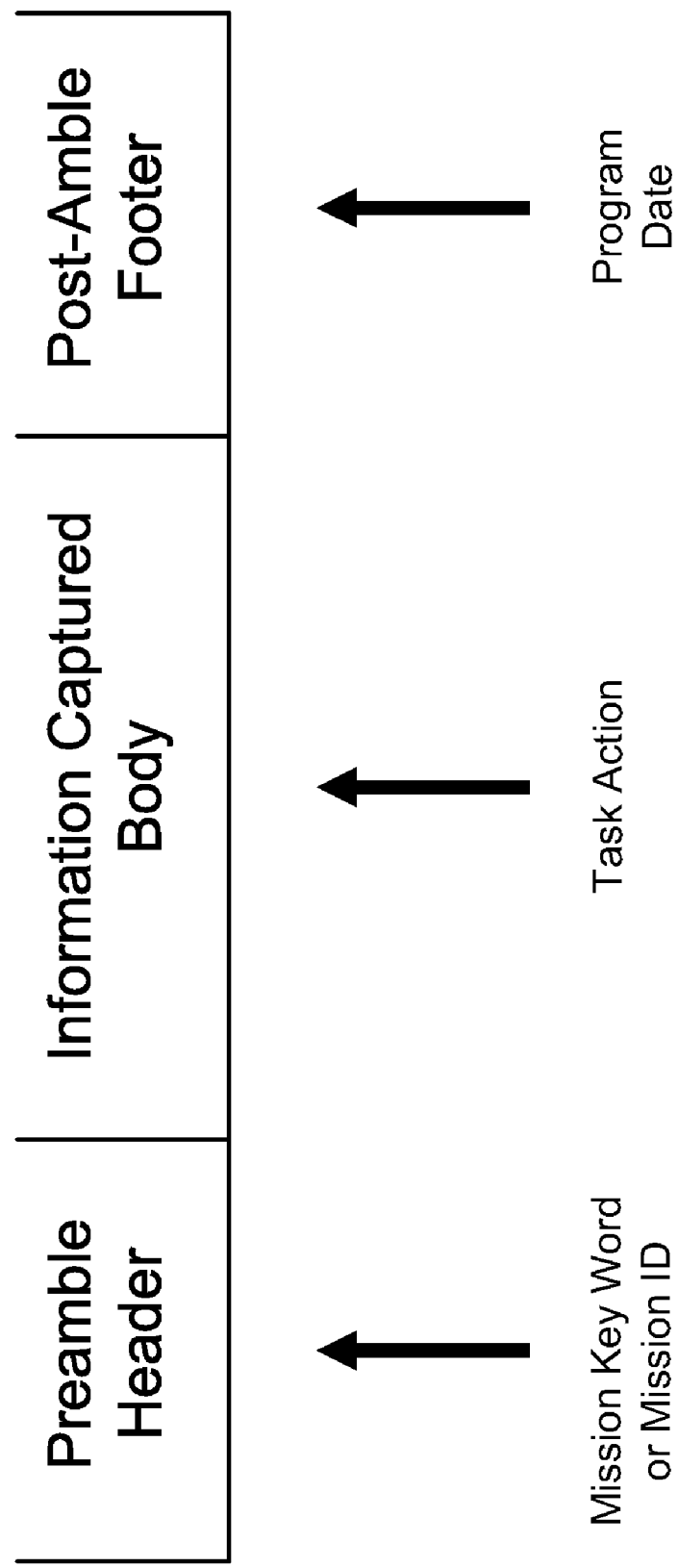
FIG. 6 is an example of a user coding of a task action.

A general overview of the operation, indicated generally at 500, is shown in FIG. 5. Steps 510 and 520 of the database system are directed to strategic planning. These steps are important toward guiding the user to clearly define the elements of a given mission and the strategies to be used toward achieving the mission. The user completes as much as possible at the point in-time when the mission is entered and before moving on to the next steps. The system, as step 530 focuses the user toward capturing and collecting relevant information important to the mission. In this step, as the user reviews information, the user concludes any new actions or information deemed necessary to store, capturing them within the Action field. Step 530 is performed by the user either in series with step 520 or whenever necessary. The user may use any of the means provided within this invention to capture information and conclude next actions. Step 540 is devoted to the execution of Task Actions as programmed by the user for the duration period. Using either of the means provided within this invention, the user can view when needed all programmed actions required to be executed in order to achieve the mission.

Using the Task Issue and Action Coding and Cross-referencing Lists described above, the user is able to quickly code and list Actions and information stored within the database presenting the information back to the user in a concise and simplified list format. The coded fields allow the user to create specific lists from Task Actions previously entered that can be quickly retrieved and reviewed by the user when commanded.

One method toward displaying the specific lists is either via a computer generated screen or hardcopy sheet. The method is the same whether the outputted display by the processor is through a computing device 100 or printed from the computing device to the hardcopy sheet.

Step 1: Create Mission Plans

The system prompts the user to define a mission plan and takes the users through the following steps as shown in FIG. 3:

a) System enables user to define a mission within the Mission field: For example, an individual's mission might be to be financially secure by retirement.

b) System enables user to elaborate on the mission's vision in the Vision Field: Within the Vision field, the user expresses into words the significance of an achieved Mission.

c) System enables user to break down the mission into one or more goals: User enters one goal within the Goals field. Enter other goals for the same mission within a separate Goals fields. For example, a few goals toward the Mission of being financially secure by retirement might be to save $1 million dollars over the next 40 years, or investing money saved in 5 good performing mutual funds, or investing in real estate for both value appreciation and tax shelter, etc. The combination of all goals recorded for a given mission shall add up to an achieved mission once all goals are achieved.

d) System enables user to break down the goals into distinct objectives in the Objectives Field For each defined goal there are measurable objectives required to meet or achieve the goal. For example, the above goal "investing in real estate as both value appreciation and tax shelter," may be clarified into a measurable objective as follows: purchase a reasonably priced home in a great location with a minimum of 7 percent annual growth rate.

e) System enables user to define the strategies for each objective in the Strategy Field For each of the defined objectives, the user defines their approach (or strategy) toward achieving the objective. This is the strategy step and the user chooses one or more strategies that will achieve the previously defined objectives. The strategies are based on the user's or their organizations proven strategies or based on fundamental and known strategic management principles. For example, in defining one such strategy for the above example, "to purchase a reasonably priced home in a great location with a 7 percent minimum annual growth rate," might be through the use of a real estate company for research of the homes in a given metropolitan area.

f) System enables user to define the tactics for each strategy in the Tactics Field: A tactic is a specific decision or planned maneuver to be deployed by the user toward the strategy chosen. By virtue of choosing a specific strategy, certain activities will need to be performed based on analysis of the current situation and its opportunities. This step allows the imagination to flow by motivating the user to plan various tactics toward achieving a strategy. For example, using the example above, "use of a Real Estate Company for research of the homes in a given metropolitan area," one tactic might be to use real estate companies in the local metropolitan area, or using local real estate companies to perform further research on only homes in locations that have achieved 7% annual growth rate over the last 5 years.

Step 2: Record Known Tasks

The very first task entered within a given mission plan is the mission master. The mission master is the reference where top level planning is performed for a given Mission.

a. System enables user to assign an 'MPPS' to the first task of a Mission Plan: To designate the Mission Plan Project Sheet ('MPPS'), the user assigns to the very first task of a Mission Plan as an 'MPPS' record within the 'Issue' field. From this point on, pertinent information related to a specific mission plan is stored within this 'MPPS' task record within the Journal field. User may capture information and store it within the specific Journal by referencing the MPPS, if using voice-to-text, or by accessing the specific mission plan on the computing device 100 as needed.

b. System enables user to list all known tasks for a mission plan: The user lists out all tasks, each task is listed as a new task record in the database. For example, the tasks of (1) perform the Internet research for real estate companies in the metropolitan area, (2) call each of the Real Estate Companies derived from the research, (3) compare and decide on the Real Estate Companies in order to start the process of finding a home that meets the objective, (4) set up appointments for home walk-through, (5) decide on the home, (6) complete the contract, (7) move in, etc. These are all Task 'Actions' required to complete the task. As many of the Task Actions may not be immediately thought of by the user, the system enables the user to at any point, add a new Task Actions. While listing new Tasks, user uses Task Coding within the Action field and programs the Task for execution (e.g., Cm: Real Estate Co.'s from Research).

Step 3: User Captures New Information, Concludes Next Actions

The user captures and records task information relevant to completing a particular mission plan within the Action Field and, where appropriate, uses the task coding and cross-referencing lists. Throughout the user's daily routine, the user focuses on capturing ideas, thoughts, and tasks and records them by either digitally recording to the computer (using human interface device(s) and/or computer software), manually recording (using conventional handwriting) on the hardcopy sheet as shown in FIG. 4 for later entry into computing device 100, or by semi-manual process using voice recognition device that recognizes input of voice commands and records the information within the tasks table of the database. The user then sets the 'Program Date' field to the next date when the user expects that the Action may be best accomplished. At any point within the planning duration (planning duration is the time-frame span provided on the hardcopy sheet or computer generated screen), the system may present user all captured tasks not yet closed. This is where additional research is performed by the user if needed and where additional linking of tasks to tactics are made, if not already achieved. The user may review information by clicking on the 'Open Actions List' provided by the system or by selecting Open Actions within the switchboard of the database. The user reviews each open action determining whether the Action has been completed or not. If completed the user checks-off the Action. If not completed, the user programs the Action to be achieved by entering a new date within the 'Program' field. After each of the Actions within the 'Open Actions List' has been closed or reprogrammed, the user is prepared to move on.

The user confirms that the task is linked to the relevant tactic. As information can be quickly recorded in a very rapid time frame, it is more convenient to allow the user to quickly capture the Action information storing it in the mission master at least temporarily until such time as the user may link the information to the correct mission plan. Using the computer interface, the user reviews entered tasks from Step 1 identifying where each task fits with a recorded tactic within the database by linking it, for example, by dragging and dropping within the correct Tactic record. If the captured task is found not to fit within any of the respective Tactic Fields the user can discard the task by checking the 'Discard' check-box or place the task within the Mission Master.

Step 4: Executing Task Actions

At this point, the system has prompted the user to create a mission plan and has prompted the user to think about and capture specific task actions in the Task Action field for each of the mission plans. The user is poised to begin executing the task actions and the system has enabled the user the ability to review any of the lists coded using the Task Action Coding and Cross-referencing Lists or from the 'Open Actions Lists' sorted by 'Program Date'. The lists can be generated via user commands within the computer generated screen, by printed hardcopy sheet or by voice recognition and either can be utilized to plan and capture new information.

Figure 7:
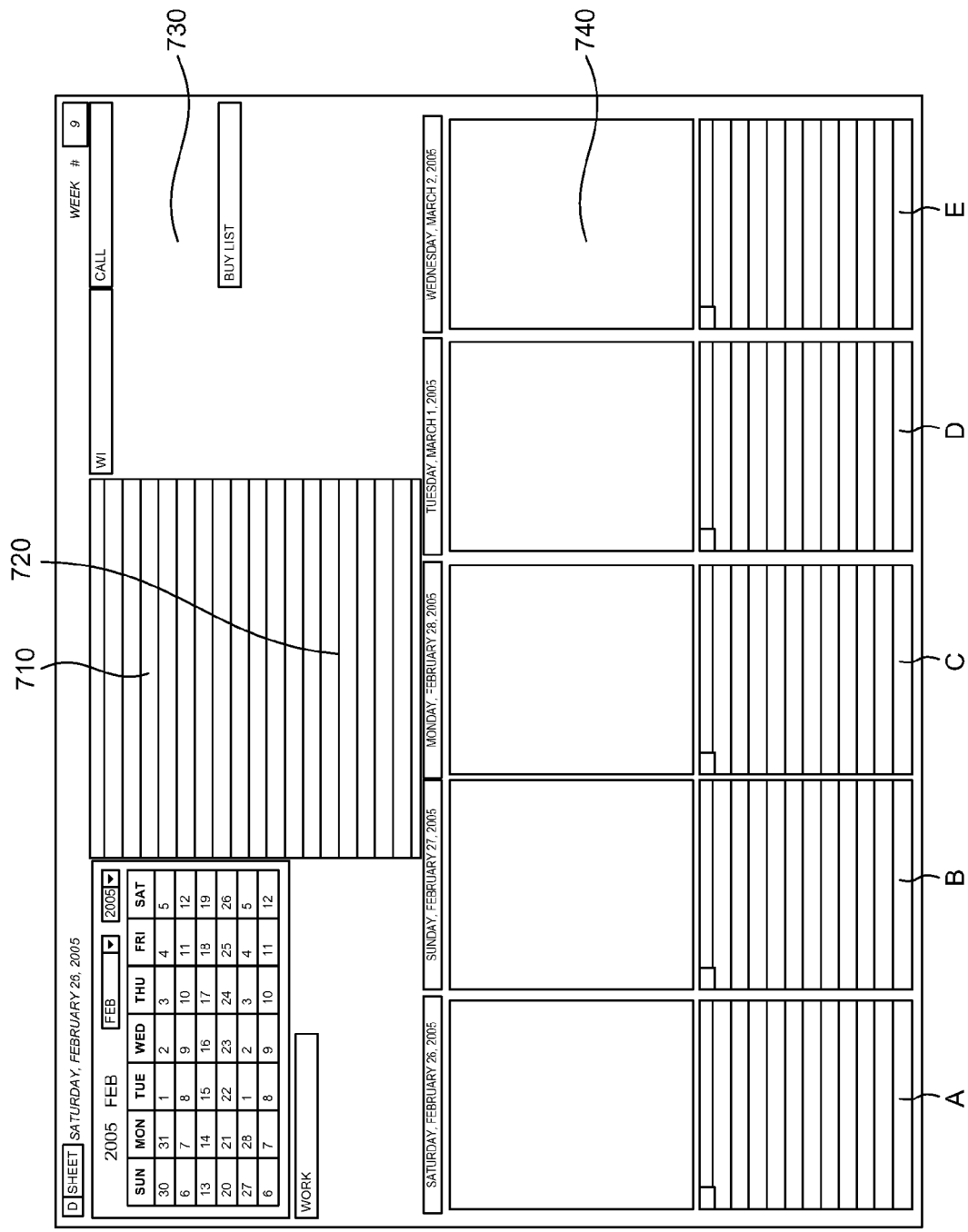
FIG. 7 is an illustration of the graphical display of the present invention.

The user begins execution of the task action listed in the Task Action Field by designating the planning period within either the computer generated screen or printed hardcopy sheet, one embodiment of which is shown in FIG. 7. Alternatively, a Voice-to-Text and Text-to-Voice Recognition device may be used. The voice-to-text and text-to-voice recognition technology devices, such as available from Bluetooth Wireless Technology enables the user to capture information in fewer steps, saving a significant amount of time both in storing and recalling strategic information. Using any of these methods, the user reviews the task actions within the computer generated screen or hardcopy sheet or Voice/Text recognition and recording device.

To enhance the user's effectiveness and efficiency toward executing the listed task actions in the Task Action Field, the system presents a graphical user interface, which is printable as a hard copy sheet implements that ensures continuity of the Task 'Actions' programmed within a mission plan and thoroughness in recording and in reviewing programmed Task Actions on the computer generated screen or hardcopy sheet. As shown in FIG. 7, sections 710 and 720 preferably are designated as the area where important Task Actions, thoughts and Ideas ('Id:') are captured and recorded by the user that are not yet programmed during the planning period or tied to a specific Mission Plan (the Task Actions, thoughts or ideas are anticipated to be programmed and executed within the next planning period or later then tied to a specific Tactic ID). The what's important section, 'Wi:', indicated at 730, is used to capture important Task Actions required to be completed during the planning period or during a future planning period. As one day or a plurality of days may be generated, 'Wi:', represents the first thing the user attempts to execute based on what's been programmed within the system or what is on the forefront of the user's thoughts about the planning period (what they are compelled or required to execute). The database of the system automatically lists the top 5 'Wi:' Task Actions already recorded within the system with the greatest frequency of tracking (greatest frequency is determine by Task Actions that are open, identified as 'Wi:', and sorted by age). 'Wi:' Task Actions are either recorded within the computer generated screen or manually written on the hardcopy sheet.

Scanning from Section 710 and 720 of FIG. 7, the user begins by reviewing Task Actions including any thoughts or ideas listed in the what's important section and new ideas section. If the Task Actions can be completed during the planning period the user programs them for the respective day within the planning period using the computer generated screen or hardcopy sheet.

Section 730 contains user designated lists defined either from the Task Action List Coding and Cross-referencing Codes or with the lists preferred to be shown as defined by the user at the beginning of their planning period. The default lists are 'C:' (networking and calling) and 'B:' (Buy list). The user may define numerous separate lists within Section 730, using either of the Task Action List Coding and Cross-referencing Codes or codes defined on their own. For designated lists, the top ten Task Actions of each retrieved list will show up on the computer generated screen or hardcopy sheet.

Section 740 lists Task Actions as programmed by the user throughout the planning period. Up to twenty Task Actions are listed for each planning day. Section 740A through Section 740E displays the user's planning period. Per the example the planning period is 5 days (but the planning period may be defined as one or more days. In each section 740A through 740E, programmed Task Actions are listed within the respective day(s) of the planning period.

Throughout the planning period, the system focuses the user on the present day. The user may scan each task action deciding which can be executed next. After review of all Task Actions for a given day, the user chooses one or more Task Actions and executes them throughout the planning day (at least executes as much of the Task Action or Actions as possible). If determined by the user that a specific Task Action cannot be executed on the given day, the user re-programs the Task Action to a future date (as desired by the user) using either the computer generated screen or hardcopy sheet. At the end of the day, the user reviews all Task Actions closing the Task Actions executed and reprogramming the Task Actions for a future date that were not executed.

Additionally, when meetings are set using the 'M:', when recorded on the computing device, an automatic email and calendar event is sent via email to the users computing device allowing them to plan meetings while mobile.

At the end of the planning period of the computer generated screen or hardcopy sheet, the user reviews all recorded Task Actions from section 410 and 420 above and links them (using the computing device of choice) to a specific Tactic ID additionally programming them for execution based on the best estimated opportunity date to achieve the Task Action.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

The invention provides a structural foundation for a user to capture, catalogue and separate the important from the not so important. Moreover, it relates to a strategic project management planning system, and more specifically to a database system which produces a sheet or screen, or a series of sheets or screens for personal project management over one or a plurality of days. It allows the user the capability of printing the sheet anywhere or using a computer processor and screen to view any number of days. The use of the database field coding and key word assignment conventions reduce recording and retrieval of information to one step allowing the user to quickly record and retrieve information.

What the claims of this invention provide is the ability for a user to align each of their missions and visions with their respective goals, objectives, strategy, tactics and tasks forcing them to tie every possible task they perform to a defined mission thereby increasing their probabilities of success toward achieving their missions and visions. It also uses a dynamic planning concept allowing the user to plan as they go, not being tied strictly to a computing device when unable, inconvenient or unsafe, allowing the user to be freely mobile and completely digital.

Although the description of the invention embodiment contains many specificities, these should not be construed as limiting the scope of the invention but as merely providing illustrations of some of the presently preferred embodiments of this invention. Various other embodiments are possible within invention's scope. For example, the printed hardcopy sheet can be folded up and placed within a money clip or wallet allowing the user to carry the sheet anywhere completely assured of capturing important thoughts, ideas, Task Actions, etc., anywhere the user goes.

The invention claimed is:

1. One or more non-transitory computer-readable media having computer-executable instructions embodied thereon that, when executed, perform a method for organizing and displaying a strategic planning model to facilitate the planning, scheduling, task input, and execution of a set of one or more tasks for a strategic initiative, the method comprising:
   receiving one or more user inputs for an issue field and one or more action fields related to the issue fields;
   receiving one or more user inputs for one of a task issue code related to the issue field and a task action code related to one or more action fields; and
   organizing the user input to provide a searchable database for one or more of the issue field, the action field, the task issue code and the task action code,
   wherein the task issue code includes a designation of a type of a project planning sheet and is associated with a keyword assigned to the project planning sheet.

2. The media as recited in claim 1, further comprising the step of receiving one or more user inputs for a mission field, a vision field, one or more goal fields associated with the mission field, one or more objective fields for each goal field, one or more strategy fields for each objective field, one or more tactic fields for each strategy field and one or more task fields for each tactic field, wherein the one or more task fields comprises the issue field and the one or more action fields.

3. The media as recited in claim 1, wherein the step of receiving one or more user inputs for one of a task issue code related to the issue field and a task action code related to one or more action fields comprises the steps of receiving a user input of one of a mission plan project sheet identifier and a project planning sheet identifier for the task issue code.

4. The media as recited in claim 1, further comprising the step of generating a list based on the task issue code.

5. The media as recited in claim 1, further comprising the step of generating a list based on one or more of the task action codes.

6. The media as recited in claim 2, wherein the step of receiving one or more user inputs for the task fields for each tactic further comprises receiving one or more inputs for a journal field.

7. The media as recited in claim 1, further comprising: monitoring the action field for the greatest frequency of tracking.

8. A computer system for organizing and displaying a strategic planning model to facilitate the planning, scheduling, task input, and execution of a set of one or more tasks for a strategic initiative, the system comprising one or more computing devices having a processor and a memory and configured to execute:
   a first receiving component that receives one or more user inputs for an issue field and one or more action fields related to the issue fields;
   a second receiving component that receives one or more user inputs for one of a task issue code related to the issue field and a task action code related to one or more action fields, the task issue code including a designation of a type of a project planning sheet and being associated with a keyword assigned to the project planning sheet; and
   an organizing component that organizes the user input to provide a searchable database for one or more of the issue field, the action field, the task issue code and the task action code.

* * * * *